United States Patent
Sun et al.

(10) Patent No.: US 11,445,162 B2
(45) Date of Patent: Sep. 13, 2022

(54) METHOD AND DEVICE FOR CALIBRATING BINOCULAR CAMERA

(71) Applicant: Beijing Smarter Eye Technology Co. Ltd., Beijing (CN)

(72) Inventors: Zhao Sun, Beijing (CN); Haitao Zhu, Beijing (CN); Yongcai Liu, Beijing (CN); Shanshan Pei, Beijing (CN); Xinliang Wang, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 0 days.

(21) Appl. No.: 17/123,999

(22) Filed: Dec. 16, 2020

(65) Prior Publication Data
US 2021/0385425 A1    Dec. 9, 2021

(30) Foreign Application Priority Data
Jun. 5, 2020 (CN) .................. 202010502598.X

(51) Int. Cl.
| H04N 13/246 | (2018.01) |
| G06T 7/80 | (2017.01) |
| G06T 7/73 | (2017.01) |
| H04N 13/239 | (2018.01) |
| B60R 11/04 | (2006.01) |

(52) U.S. Cl.
CPC .......... *H04N 13/246* (2018.05); *B60R 11/04* (2013.01); *G06T 7/73* (2017.01); *G06T 7/85* (2017.01); *H04N 13/239* (2018.05); *G06T 2207/10012* (2013.01)

(58) Field of Classification Search
CPC ...... H04N 13/246; H04N 13/239; G06T 7/85; G06T 7/73
USPC ............................................................ 348/46
See application file for complete search history.

(56) References Cited

U.S. PATENT DOCUMENTS

| 2012/0154547 A1* | 6/2012 | Aizawa | G02B 30/52 348/47 |
| 2019/0208181 A1* | 7/2019 | Rowell | H04N 5/23267 |
| 2020/0226392 A1* | 7/2020 | Hua | G06V 20/58 |

* cited by examiner

*Primary Examiner* — Amir Shahnami
(74) *Attorney, Agent, or Firm* — Novick, Kim & Lee, PLLC; Allen Xue

(57) ABSTRACT

The present disclosure provides a method for calibrating a binocular camera, including: S2 of extracting feature points from an image set 1 and an image set 2 taken at two points separated from each other by a predetermined distance; S3 of fitting Gaussian distribution parameters of each feature point, and extracting a desired value as a theoretical disparity; S4 of selecting a common feature point, and calculating the predetermined quantity of frames at a first theoretical distance and the predetermined quantity of frames at a second theoretical distance; S5 of performing Gaussian fitting on a difference between the theoretical distances of the common feature point, and extracting a variance as an evaluation index; S6 of determining whether the evaluation index is smaller than a threshold, if yes, terminating the calibration, and otherwise, proceeding to S7; and S7 of adjusting posture parameters of the binocular camera, and returning to S3.

7 Claims, 1 Drawing Sheet

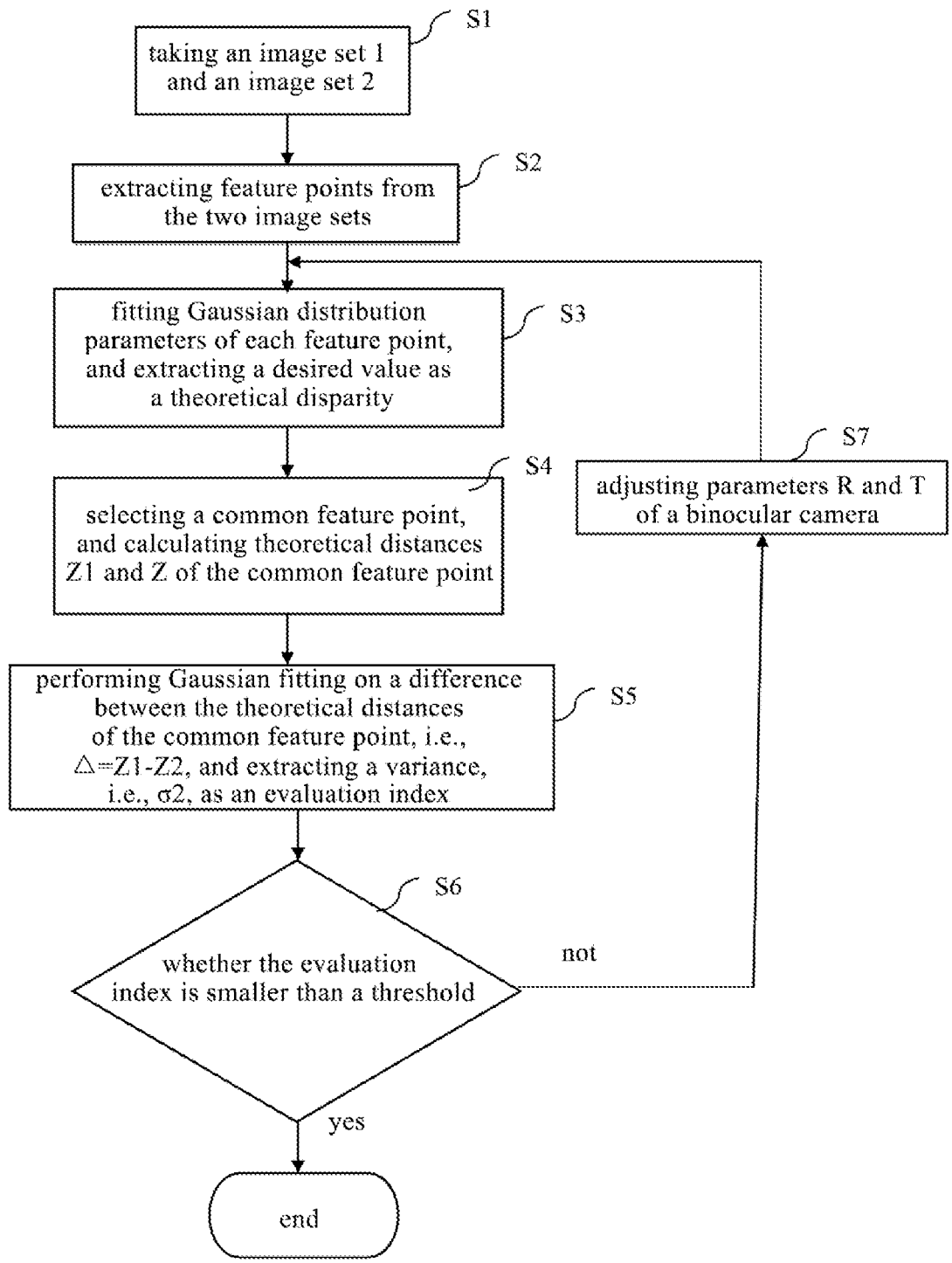

METHOD AND DEVICE FOR CALIBRATING BINOCULAR CAMERA

TECHNICAL FIELD

The present disclosure relates to the field of driving assistant system or automatic driving of vehicles, in particular to a method and a device for calibrating a binocular camera.

BACKGROUND

Correct stereo matching is a basis for normal operation of a binocular camera, and it requires that the binocular camera meets a theoretical model of "alignment of epipolar lines". In an ideal state where the epipolar lines are in alignment with each other, an alignment error is 0. As a calculation method, a row coordinate of a pixel of a feature point in a right image is subtracted from a row coordinate of a pixel of a feature point in a left image. However, in actual use, due to the comprehensive effect of various factors, a position relationship between lenses of the binocular camera gradually changes over time. As a result, the theoretical model of "alignment of epipolar lines" is destroyed, and it is necessary to calibrate posture parameters R and T of the binocular camera.

SUMMARY

An object of the present disclosure is to provide a method and a device for calibrating a binocular camera, so as to modify an "alignment of epipolar lines" model of the binocular camera.

In one aspect, the present disclosure provides in some embodiments a method for calibrating a binocular camera, including: S2 of extracting feature points from an image set 1 and an image set 2 taken at two points separated from each other by a predetermined distance; S3 of fitting Gaussian distribution parameters of each feature point, and extracting a desired value as a theoretical disparity; S4 of selecting a common feature point, and calculating the predetermined quantity of frames at a first theoretical distance and the predetermined quantity of frames at a second theoretical distance; S5 of performing Gaussian fitting on a difference between the theoretical distances of the common feature point, and extracting a variance as an evaluation index; S6 of determining whether the evaluation index is smaller than a threshold, if yes, terminating the calibration, and otherwise, proceeding to S7; and S7 of adjusting posture parameters of the binocular camera, and returning to S3.

In a possible embodiment of the present disclosure, prior to S2, the method further includes S1 of taking the image set 1 and the image set 2 at the two points separated from each other by the predetermined distance. S1 includes: S11 of taking the predetermined quantity of frames in a current scene in the case that the binocular camera is in a stationary state, and marking the frames as the image set 1; and S12 of moving the binocular camera for the predetermined distance in a fixed direction in the same scene, taking the predetermined quantity of frames in the scene in the case that the binocular camera is in the stationary state, and marking the frames as the image set 2.

In a possible embodiment of the present disclosure, S3 includes: S31 of calculating a disparity of each feature point with respect to each image in the image set 1; S32 of performing statistical analysis on the disparities in the predetermined quantity of frames with respect to each feature point, to acquire a Gaussian fitting model; S33 of selecting a desired value of the Gaussian fitting model as a theoretical disparity of the feature point; S34 of repeating the above procedure with respect to each feature point in the image set 1, to acquire the theoretical disparities of all the feature points in the image set 1; and S35 of repeating S31 to S34 with respect to the image set 2, to acquire theoretical disparities of all the feature points in the image set 2.

In a possible embodiment of the present disclosure, S4 includes: S41 of selecting the common feature points existing in the image set 1 and the image set 2; S42 of calculating the predetermined quantity of frames at the first theoretical distance in accordance with the theoretical disparity of each selected common feature point in the image set 1; and S43 of calculating the predetermined quantity of frames at the second theoretical distance in accordance with the theoretical disparity of each selected common feature point in the image set 2.

In a possible embodiment of the present disclosure, S5 includes: S51 of calculating the difference between the first theoretical distance and the second theoretical distance of each selected common feature point; and S52 of performing the Gaussian fitting on the difference between the theoretical distances of each selected common feature point to acquire Gaussian distribution with the desired value being equal to the predetermined distance, and extracting the variance as the evaluation index.

In another aspect, the present disclosure provides in some embodiments a memory device storing therein a plurality of instructions. The instructions are loaded and executed by a processor so as to perform the following steps: S2 of extracting feature points from an image set 1 and an image set 2 taken at two points separated from each other by a predetermined distance; S3 of fitting Gaussian distribution parameters of each feature point, and extracting a desired value as a theoretical disparity; S4 of selecting a common feature point, and calculating the predetermined quantity of frames at a first theoretical distance and the predetermined quantity of frames at a second theoretical distance; S5 of performing Gaussian fitting on a difference between the theoretical distances of the common feature point, and extracting a variance as an evaluation index; S6 of determining whether the evaluation index is smaller than a threshold, if yes, terminating the calibration, and otherwise, proceeding to S7; and S7 of adjusting posture parameters of the binocular camera, and returning to S3.

In yet another aspect, the present disclosure provides in some embodiments a vehicle with a binocular camera, including a processor configured to execute a plurality of instructions, and a memory device storing therein the plurality of instructions. The instructions are loaded and executed by the processor so as to perform the following steps: S2 of extracting feature points from an image set 1 and an image set 2 taken at two points separated from each other by a predetermined distance; S3 of fitting Gaussian distribution parameters of each feature point, and extracting a desired value as a theoretical disparity; S4 of selecting a common feature point, and calculating the predetermined quantity of frames at a first theoretical distance and the predetermined quantity of frames at a second theoretical distance; S5 of performing Gaussian fitting on a difference between the theoretical distances of the common feature point, and extracting a variance as an evaluation index; S6 of determining whether the evaluation index is smaller than a threshold, if yes, terminating the calibration, and otherwise, proceeding to S7; and S7 of adjusting posture parameters of the binocular camera, and returning to S3.

The present disclosure has the following beneficial effects. The image set 1 and the image set 2 may be taken at the two points separated from each other by the predetermined distance, the first theoretical distance and the second theoretical distance of the each common feature point in the image sets may be calculated, the Gaussian fitting may be performed on the difference between the theoretical distance of each common feature point, the variance may be extracted as the evaluation index, the calibration may be terminated when the evaluation index is smaller than the threshold, and the posture parameters of the binocular camera may be adjusted continuously and an evaluation process may be repeated when the evaluation index is not smaller than the threshold. As a result, it is able to modify the "alignment of epipolar lines" model of the binocular camera.

BRIEF DESCRIPTION OF THE DRAWINGS

FIG. 1 is a flow chart of a method for calibrating a binocular camera according to one embodiment of the present disclosure.

DETAILED DESCRIPTION

The present disclosure will be described hereinafter in conjunction with the drawings and embodiments. The following embodiments are for illustrative purposes only, but shall not be used to limit the scope of the present disclosure.

As shown in FIG. 1, the present disclosure provides in some embodiments a method for calibrating a binocular camera, which includes: S1 of taking an image set 1 and an image set 2 at two points separated from each other by a predetermined distance s; S2 of extracting feature points from the image set 1 and the image set 2; S3 of fitting Gaussian distribution parameters of each feature point, and extracting a desired value as a theoretical disparity; S4 of selecting a common feature point, and calculating theoretical distances Z1 and Z2 of the common feature point; S5 of performing Gaussian fitting on a difference between the theoretical distances of the common feature point, i.e., $\Delta = Z1 - Z2$, and extracting a variance, i.e., $\sigma^2$, as an evaluation index; S6 of determining whether the evaluation index is smaller than a threshold, if yes, terminating the calibration, and otherwise, proceeding to S7; and S7 of adjusting posture parameters R and T of the binocular camera, and returning to S3.

S1 may include: S11 of taking 100 frames in a current scene in the case that the binocular camera is in a stationary state, and marking the frames as the image set 1; and S12 of moving the binocular camera for the predetermined distance s in a fixed direction in the same scene, taking 100 frames in the scene in the case that the binocular camera is in the stationary state, and marking the frames as the image set 2.

S3 may include: S31 of calculating a disparity of each feature point with respect to each image in the image set 1; S32 of performing statistical analysis on 100 disparities in the 100 frames with respect to each feature point (with an x-axis representing the disparity and a y-axis presenting a frequency) to acquire a Gaussian fitting model with a desired value as d and the variance as $\sigma_1^2$; S33 of selecting the desired value d of the Gaussian fitting model as a theoretical disparity of the feature point; S34 of repeating the above procedure with respect to each feature point in the image set 1, to acquire the theoretical disparities of all the feature points in the image set 1; and S35 of repeating S31 to S34 with respect to the image set 2, to acquire theoretical disparities of all the feature points in the image set 2.

S4 may include: S41 of selecting the common feature points existing in the image set 1 and the image set 2; S42 of calculating the theoretical distance Z1 in accordance with the theoretical disparity of each selected common feature point in the image set 1; and S43 of calculating the theoretical distance Z2 in accordance with the theoretical disparity of each selected common feature point in the image set 2.

S5 may include: S51 of calculating the difference between a theoretical distance $Z1_i$ of each selected common feature point in the image set 1 and a theoretical distance $Z2_i$ of each selected common feature point in the image set 2 through a formula $\Delta_i = Z1_i - Z2_i$; and S52 of performing the Gaussian fitting on the difference $\Delta_i$ between the theoretical distances of each selected common feature point to acquire Gaussian distribution with a desired value as $\Delta_c$, which is equal to the predetermined distance s moved by the binocular camera for taking the image set 1 and the second image set 2, and a variance as $\sigma_c^2$.

S6 may include, when the variance in the Gaussian distribution parameters acquired through fitting is smaller than the predetermined threshold, terminating the calibration, and when the variance is not smaller than the predetermined threshold, calibrating the binocular camera continuously.

The present disclosure further provides in some embodiments a memory device storing therein a plurality of instructions, and the instructions are loaded and executed by a processor so as to implement the above-mentioned method. In addition, the present disclosure further provides in some embodiments a vehicle with a binocular camera, which includes the memory device and a processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for calibrating a binocular camera, comprising:

S2 of extracting a plurality of feature points from an image set 1 and an image set 2 taken at two points separated from each other by a predetermined distance (s);

S3 of fitting Gaussian distribution parameters of each feature point, and extracting an expected value as a theoretical disparity;

S4 of selecting a common feature point amongst the plurality of feature points, and calculating a first theoretical distance (Z1) and a second theoretical distance (Z2) of the common feature point;

S5 of performing Gaussian fitting on a difference between the theoretical distances Z1 and Z2 of the common feature point ($\Delta = Z1 - Z2$), and extracting a variance ($\sigma^2$) as an evaluation index;

S6 of determining whether the evaluation index is smaller than a threshold, terminating the calibration when the evaluation index is smaller than the threshold, or proceeding to S7 when the evaluation index is not smaller than the threshold; and S7 of adjusting posture parameters of the binocular camera, and returning to S3, wherein S3 comprises: S31 of calculating a disparity of each feature point with respect to each image in the image set 1; S32 of performing statistical analysis on the disparities in the predetermined quantify of frames with respect to each feature point to acquire a Gaussian fitting model; S33 of selecting the expected value of the Gaussian fitting model as the theoretical disparity of the feature point; S34 of repeating S31 to S33 with respect to each feature point in the image set 1 to acquire the theoretical disparities of all the feature points in the image set 1; and S35 of repeating S31 to S34 with respect to the image set 2 to acquire theoretical disparities of all the feature points in the image set 2.

2. The method according to claim 1, further comprising: prior to S2, S1 of taking the image set 1 and the image set 2 at the two points separated from each other by the predetermined distance (s), wherein S1 comprises: S11 of taking the predetermined quantity of frames in a current scene in the case that the binocular camera is in a stationary state, and marking the frames as the image set 1; and S12 of moving the binocular camera from the predetermined distance (s) in a fixed direction in the same scene, taking the predetermined quantity of frames in the scene in the case that the binocular camera is in the stationary state, and marking the frames as the image set 2.

3. The method according to claim 1, wherein S4 comprises: S41 of selecting the common feature points existing in the image set 1 and the image set 2; S42 of calculating the first theoretical distance (Z1) in accordance with the theoretical disparity of each selected common feature point in the image set 1; and S43 of calculating the second theoretical distance (Z2) in accordance with the theoretical disparity of each selected common feature point in the image set 2.

4. A method for calibrating a binocular camera, comprising:
S1 of taking the image set 1 and the image set 2 at the two points separated from each other by a predetermined distance (s),
S2 of extracting a plurality of feature points from an image set 1 and an image set 2;
S3 of fitting Gaussian distribution parameters of each feature point, and extracting an expected value as a theoretical disparity;
S4 of selecting a common feature point, and calculating a first theoretical distance (Z1) and a second theoretical distance (Z2) of the common feature point;
S5 of obtaining an evaluation index, which comprises: S51 of calculating a difference between the first theoretical distance ($Z1_i$) and the second theoretical distance ($Z2_i$) of each selected common feature point according to a formula $\Delta_i = Z1_i\_31\ Z2_i$; and S52 of performing the Gaussian fitting on the difference ($\Delta_i$) between the theoretical distances of each selected common feature point to acquire Gaussian distribution with the expected value ($\Delta_c$) being equal to the predetermined distance (s), and extracting the variance ($\sigma^2$) as the evaluation index,
S6 of determining whether the evaluation index is smaller than a threshold, terminating the calibration when the evaluation index is smaller than the threshold, or proceeding to S7 when the evaluation index is not smaller than the threshold; and
S7 of adjusting posture parameters of the binocular camera, and returning to S3.

5. A memory device storing therein a plurality of instructions, wherein the instructions are loaded and executed by a processor so as to perform the following steps:
S2 of extracting feature points from an image set 1 and an image set 2 taken at two points separated from each other by a predetermined distance (s);
S3 of fitting Gaussian distribution parameters of each feature point, and extracting an expected value as a theoretical disparity;
S4 of selecting a common feature point, and calculating a first theoretical distance (Z1) and a second theoretical distance (Z2) of the common feature point;
S5 of performing Gaussian fitting on a difference between the theoretical distances of the common feature point ($\Delta = Z1 - Z2$), and extracting a variance ($\sigma^2$) as an evaluation index;
S6 of determining whether the evaluation index is smaller than a threshold, if yes, terminating the calibration, and otherwise, proceeding to S7; and
S7 of adjusting posture parameters of the binocular camera, and returning to S3,
wherein S3 comprises: S31 of calculating a disparity of each feature point with respect to each image in the image set 1; S32 of performing statistical analysis on the disparities in the predetermined quantity of frames with respect to each feature point to acquire a Gaussian fitting model; S33 of selecting the expected value of the Gaussian fitting model as the theoretical disparity of the feature point; S34 of repeating S31 to S33 with respect to each feature point in the image set 1 to acquire the theoretical disparities of all the feature points in the image set 1;
and S35 of repeating S31 to S34 with respect to the image set 2, to acquire theoretical disparities of all the feature points in the image set 2.

6. A vehicle with a binocular camera, comprising a processor configured to execute a plurality of instructions, and a memory device storing therein the plurality of instructions, wherein the instructions are loaded and executed by the processor so as to perform the following steps:
S2 of extracting feature points from an image set 1 and an image set 2 taken at two points separated from each other by a predetermined distance (s);
S3 of fitting Gaussian distribution parameters of each feature point, and extracting an expected value as a theoretical disparity;
S4 of selecting a common feature point, and calculating a first theoretical distance (Z1) and a second theoretical distance (Z2) of the common feature point;
S5 of obtaining a variance ($\sigma^2$) as an evaluation index, which comprises: S51 of calculating a difference between the first theoretical distance ($Z1_i$) and the second theoretical distance ($Z2_i$) of each selected common feature point through a formula $\Delta_i = Z1_i - Z2_i$; and S52 of performing the Gaussian fitting on the difference ($\Delta_i$) between the theoretical distances of each selected common feature point to acquire Gaussian distribution with the expected value ($\sigma_c$) being equal to the predetermined distance (s), and extracting the variance ($\sigma^2$) as the evaluation index;
S6 of determining whether the evaluation index is smaller than a threshold, if yes, terminating the calibration, and otherwise, proceeding to S7; and
S7 of adjusting posture parameters of the binocular camera and returning to S3.

7. The method of claim 4, wherein S1 comprises: S11 of taking the predetermined quantity of frames in a current scene in the case that the binocular camera is in a stationary state, and marking the frames as the image set 1; and S12 of moving the binocular camera from the predetermined distance (s) in a fixed direction in the same scene, taking the predetermined quantity of frames in the scene in the case that the binocular camera is in the stationary state, and marking the frames as the image set 2.

\* \* \* \* \*